(12) United States Patent
Zheng et al.

(10) Patent No.: US 9,768,496 B1
(45) Date of Patent: Sep. 19, 2017

(54) NEAR FIELD COUPLER ARRAY

(71) Applicant: AMAZON TECHNOLOGIES, INC., Seattle, WA (US)

(72) Inventors: Ming Zheng, Cupertino, CA (US); Adrian Napoles, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 106 days.

(21) Appl. No.: 14/713,934

(22) Filed: May 15, 2015

(51) Int. Cl.
*H01Q 1/48* (2006.01)
*H01Q 7/00* (2006.01)
*H01Q 21/00* (2006.01)

(52) U.S. Cl.
CPC ............... *H01Q 1/48* (2013.01); *H01Q 7/00* (2013.01); *H01Q 21/0075* (2013.01)

(58) Field of Classification Search
CPC .. H01Q 1/48; H01Q 9/40; H01Q 9/43; H01Q 1/43
USPC ................... 343/848, 705, 711, 829
See application file for complete search history.

(56) References Cited

U.S. PATENT DOCUMENTS

2014/0266963 A1* 9/2014 Fasenfest ............ H01Q 9/045
343/857

OTHER PUBLICATIONS

Modern Antenna Design, 2nd Edition, Thomas A. Milligan, 2005.*

* cited by examiner

*Primary Examiner* — Dameon E Levi
*Assistant Examiner* — Collin Dawkins
(74) *Attorney, Agent, or Firm* — Lowenstein Sandler LLP

(57) ABSTRACT

An antenna to communicate at a defined frequency; a feed point; and a near-field coupler array coupled to the feed point is described. The near-field coupler array may include a substrate; a ground plane on a first side of the substrate; and a near-field coupler array disposed on a second side of the substrate. The ground plane may include a first aperture and a second aperture. The near-field coupler array can include a first coupler element aligned with the first aperture and a second coupler element aligned with the second aperture. A first width of the first coupler element can be larger than a second width of the first aperture. A third width of the second coupler element can be larger than a fourth width of the second aperture. The first width and the third width can have a correlation to the defined frequency.

19 Claims, 6 Drawing Sheets

NEAR FIELD COUPLER ARRAY

BACKGROUND

A growing number of devices use near field communications (NFC) for a variety of purposes. For example, an NFC antenna can be used in mobile phones, personal digital assistants (PDAs), computers, check-out registers or point-of-sale equipment, vending machines, parking meters, automated teller machines (ATM), and so forth. An NFC antenna enables smartphones and other devices to establish radio communication with each other by touching them together or bringing them into proximity, such as at a distance of 10 centimeters (cm) or less.

The relatively small communication distance between devices can provide a secure communication channel because other devices may not intercept a communication for a farther distance away. For example, NFC devices may be used for payment transactions or other financially critical applications. Typically, to communicate using NFC, a device needs a separate NFC antenna. However, while many devices may have multiple antennas to communicate on cellular networks, wireless local area networks (WLAN) (e.g., Wi-Fi® network), or a personal area network (e.g., Bluetooth® network), the devices may lack a separate NFC antenna. While NFC can provide a convenient and secure communication channel between devices, the use of NFC may be limited as many devices may not have a separate NFC antenna.

BRIEF DESCRIPTION OF DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
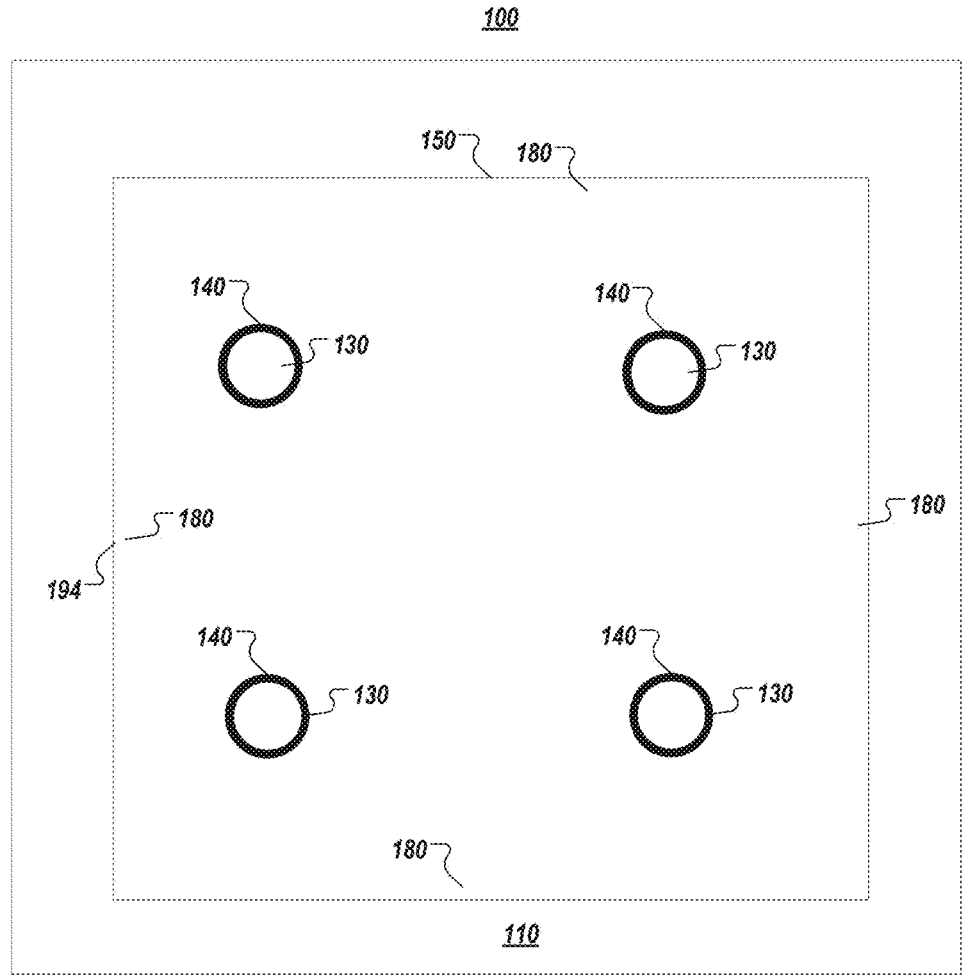
FIG. 1 illustrates an electronic device 100 with a near field coupler array 110 according to one an embodiment.

Many electronic devices may have multiple antennas configured to transmit and/or receive signals at different frequencies or for different types of wireless communications networks and cellular communications networks. The electronic devices (e.g., user devices) can be electronic book readers, cellular telephones, personal digital assistants (PDAs), portable media players, tablet computers, netbooks, laptops, and so forth. To wirelessly communicate with other devices, these electronic devices can include multiple antennas, such as a personal area network (PAN) antenna, a wireless area network (WAN) antenna, a wireless local area network (WLAN) antenna, and/or a cellular network antenna. The antenna can be configured to communicate on one or more types of communication networks, such as communications networks using the Bluetooth® technology, the Zigbee® technology, the Wi-Fi® technology, or various cellular communication technologies.

A device using an antenna, such as a PAN antenna or a WLAN antenna, to communicate information can communicate the information over a relatively long distance. However, as the data may be communicated over relatively long distances, the data may be intercepted by an unauthorized device or may be interfered with by other devices or objects. A proliferation of unauthorized and fraudulent activities (such as identity theft) can increase a demand for secure methods to perform transactions, such as financial transactions. For example, traditional credit card readers that previously read information from a magnetic stripe on a surface of a credit card may now include near field communication (NFC) payment systems to communicate secure information while reducing a likelihood of credit card loss or theft.

When devices may be communicating sensitive or secure information, near field communication (NFC) can be used to reduce or eliminate an interception of data and to avoid interference. Traditionally, to communicate data using NFC, a device may include a separate NFC antenna to communicate with another device having a corresponding NFC antenna. Devices configured to communicate using NFC antennas can establish a communications channel by bringing them within a limited range of each other, such as 0-5 centimeters. The NFC antennas can be loop inductance antennas that use magnetic fields to operate at approximately 13.56 megahertz (MHz). While NFC antennas can be used to establish NFC communications, because a majority of devices may not include separate NFC antennas, use of NFC communications has been limited.

The embodiments described herein may address the above noted deficiency by an electronic device using an antenna configured to communicate on a communication network, such as a PAN, a WLAN, or a cellular network and limiting an electric field of the antenna to a near field using a near field coupler array. An antenna coupler can be a device that can change an electrical length of an antenna (e.g., antenna tuning) so that the antenna can be switched to resonate at different frequencies for communication on different frequency bands with various types of transmitters and receivers. The near field antenna coupler can change an electrical length of an antenna to attenuate an electric field of the antenna relatively quickly and disseminate the electric field with an even signal strength distribution. An advantage of an antenna using the near field antenna coupler can be to increase reliability and consistency of the electric field for near field communication.

FIG. 1 illustrates an electronic device 100 with a near field coupler array 110 according to one an embodiment. The near field coupler array 110 can be configured to communicate on a wireless communications network or a cellular communications network, such as a Bluetooth® communications network, a ZigBee® communications network, a wireless communications network, or a cellular communications network with a signal strength that attenuates at a faster rate than a conventional antenna structure. In one example, the near field coupler array 110 can radiate electromagnetic energy when the electronic device 100 uses the near field coupler array 110 to communicate with another device and applies a current to a feed point 194 of the near field coupler array 110. When the electronic device 100 applies the current to the feed point 194, the near field coupler array 110 can radiate the electromagnetic field at a defined signal strength. In one example, the defined signal strength can attenuate at a faster rate than the signal strength of the conventional antenna structure.

The near field coupler array 110 can include a coupler substrate 150 with multiple apertures 130 and multiple coupler elements 140. The near field coupler array 110 can be configured to attenuate a signal strength based on one or more characteristics, including: a thickness of the coupler substrate 150, a diameter or width of the aperatures 130, a diameter or width of the coupler elements 140, a distance of the coupler elements 140 from a side 180 of the coupler substrate 150, and a distance of the coupler elements 140 from a center of the coupler substrate 150. In one example, a thickness of the substrate 150 can correlate with an operating frequency of the near field coupler array 110. In one example, the near field coupler array 110 can be configured to communicate using a frequency around 400 megahertz (MHz) to 1 GHz, such as frequencies used by a cellular technology. In another embodiment, the near field coupler array 110 can be configured to communicate using a frequency around 1.7 GHz to 2.4 GHz. In another embodiment, the near field coupler 110 can be configured to communicate using a frequency around 5 GHz to 6 GHz. In another example, the near field coupler array 110 can be configured to communicate using a wireless network frequency, such as frequencies used by the ZigBee® technology or by the Bluetooth® technology (e.g., 2.4 GHz). When the near field coupler array 110 may be configured to communicate at the frequency, the thickness of the coupler substrate 150 can be below 1 millimeter (mm). In another example, the near field coupler array 110 can be configured to communicate using a cellular network frequency (such as 450 MHz or 900 MHz). When the near field coupler array 110 may be configured to communicate at the cellular network frequency, the thickness of the coupler substrate 150 can exceed 1 mm.

In one example, the coupler elements 140 can have a diameter or width that may be larger than a diameter or width of the apertures 130. The diameter or width of the apertures 130 can correlate with a frequency that the near field coupler array 110 may be configured to communicate at, such as a low frequency, a high frequency, and so forth. For example, when the near field coupler array 110 may be configured to communicate at a 2.4 GHz frequency, the apertures 130 can each be about 4 mm in diameter and the coupler elements 140 can each be about 5 mm in diameter. In another example, when the coupler communicates with a device at 1 GHz, an overall dimension of the near field coupler array 110 can increase, including the coupler elements 140 and the apertures 130 may be proportionally increased.

In one example, a distance of the apertures 130 from a side 180 of the coupler substrate 150 can be a minimal distance from the side, such as 18 mm for the side 180. In one example, a distance of the apertures 130 from a side 180 of the coupler substrate 150 can correlate with a frequency the near field coupler array 110 may be configured to communicate at. For example, when the near field coupler array 110 may be configured to communicate at the frequency, the apertures 130 may correlate with a distance of a quarter wavelength of the frequency from the side 180. In another example, a location of the apertures 130 can be measured from a center of the substrate 150 and can correlate with a frequency the near field coupler array 110 may be configured to communicate at. In another example, the apertures 130 and/or the coupler elements 140 can be located at specified distances from a center of a ground plane of the near field coupler array 110.

In another example, a pattern and/or shape of the apertures 130 can change an attenuate level of the signal strength. The attenuation level can be dependent on a size of the coupler elements 140 and a size of the apertures 130. For example, as a size of the apertures 130 decreases, an attenuation level of the near field coupler array 110 increases. In one example, as a size of the apertures 130 decreases, a coupling coefficient of the near field coupler array 110 can decrease. Different coupler aperture shapes can change a coupling coefficient and attenuation because different shapes can have different surface areas. For example, an aperture 130 can be a circular shape, a square shape, a rectangular shape, and so forth. In one example, the apertures 130 can be circular apertures with corresponding circular coupler elements 140 configured to increase an attenuation of an electric field of the near field coupler array 110 (e.g., to reduce a range of the near field coupler array 110 the coupler aperture can be reduced). In another example, the apertures 130 can be configured in a square pattern.

In one example, a signal strength of a traditional coupler can slowly attenuate as a distance from a device to the traditional coupler increases. For example, an attenuation of the signal strength of the traditional coupler can be approximately inversely proportional to the distance from the device to the traditional coupler. Additionally, the signal strength of an electric field emanating from the traditional coupler may not be uniform and can greatly vary for a device in close proximity to the traditional coupler.

Figure 2A:
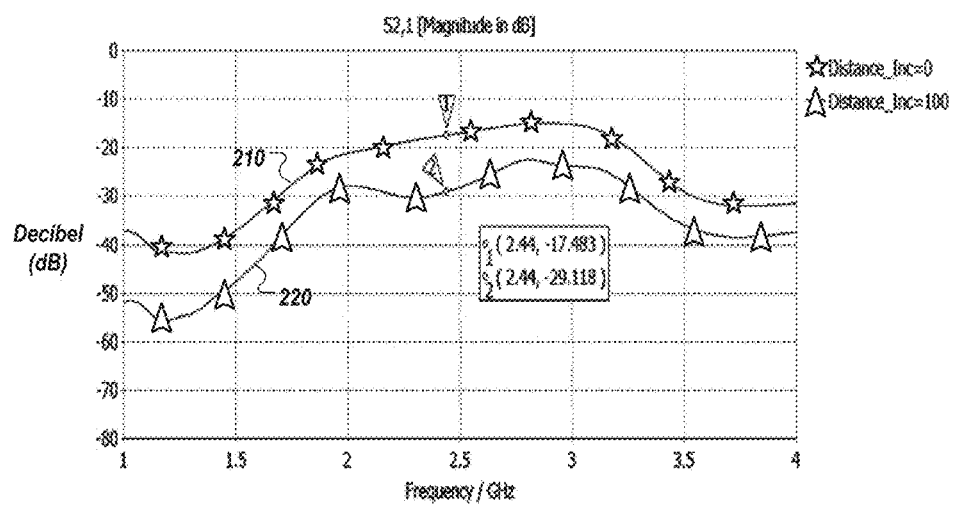
FIG. 2A illustrates a graph of a signal attenuation of an antenna with a traditional antenna coupler according to one embodiment.

FIG. 2A illustrates a graph of a signal attenuation of a traditional antenna coupler according to one embodiment. Line 210 illustrates an attenuation of a signal strength when a first device and a second device may be separated by approximately 0 millimeters (mm). In one example, 0 mm can be a relative distance, such as a distance including a housing or case thickness of a device. Line 220 illustrates the attenuation of a signal strength when the first device and the second device may be separated by approximately 100 mm. In one example, a traditional antenna coupler can be configured to communicate at a defined frequency. In one embodiment, the defined frequency can be 2.4 gigahertzes. At a frequency of 2.44 GHz, a coupling coefficient between the first device and the second device may reduce by approximately 12 dB from distance 0 mm to 100 mm (e.g., from −17 dB to −29 dB), indicating a relatively slow signal strength attenuation.

Figure 2B:
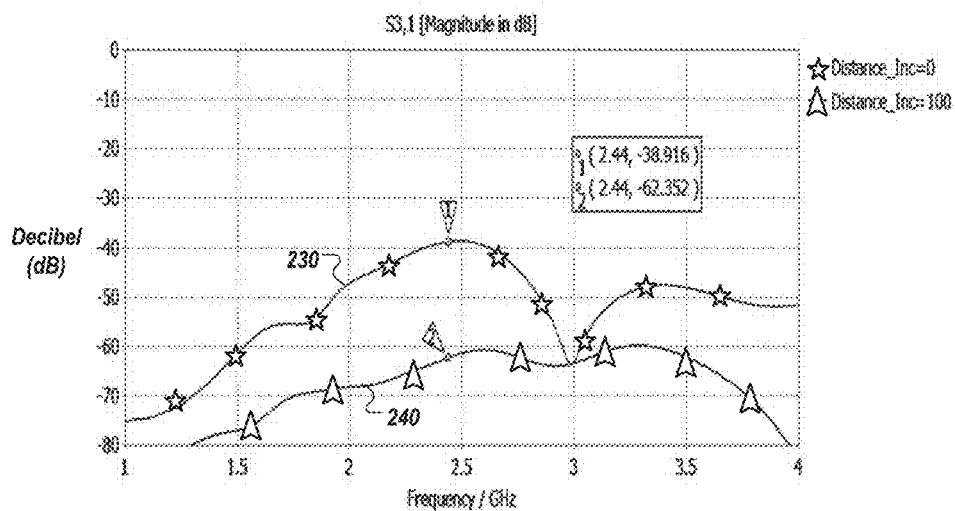
FIG. 2B illustrate a graph of a user device communicating using an antenna with a near field coupler array according to one embodiment.

FIG. 2B illustrate a graph of a user device communicating using the near field coupler array according to one embodiment. Line 230 illustrates an attenuation of a signal strength when a first device and a second device may be separated by approximately 0 millimeters (mm). Line 240 illustrates the attenuation of the signal strength when the first device and the second device may be separated by approximately 100 mm. In one example, the near field coupler array can be configured to communicate at a defined frequency. In one embodiment, the defined frequency can be 2.4 GHz. At the frequency of 2.44 GHz, a coupling coefficient between the first device and the second device may reduce by approximately 24 dB from distance 0 mm to 100 mm (e.g., from −38 dB to −62 dB), indicating a relatively rapid signal strength attenuation. FIGS. 2A and 2B illustrate that a strength of a signal for the near field coupler array attenuates faster than the traditional coupler.

Figure 3:
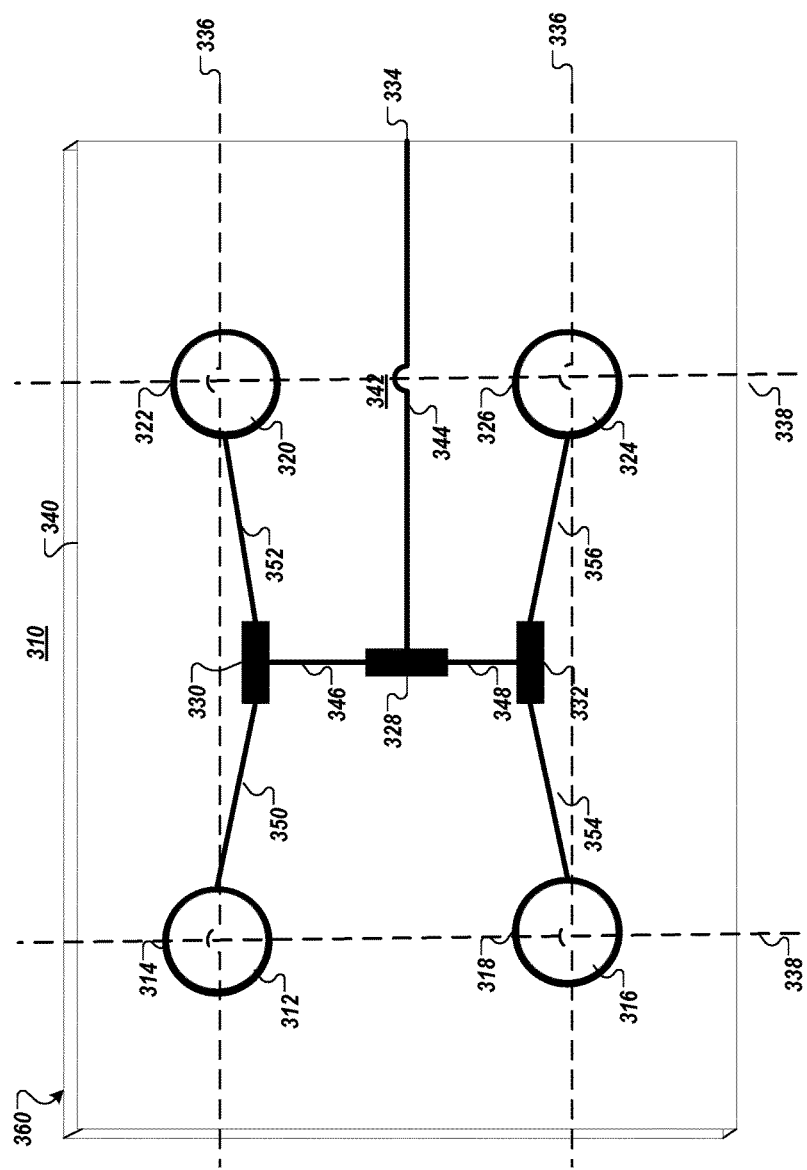
FIG. 3 illustrates a near field coupler array with multiple coupler elements according to one embodiment.

FIG. 3 illustrates a near field coupler array 310 with multiple coupler elements 314, 318, 322, and 326 according to one embodiment. In one example, the near field coupler array 310 can include an even number of apertures, such as two apertures, four apertures, eight apertures 130, and so forth. FIG. 3 provides an exemplary embodiment of the near field coupler array 310 with 4 the apertures 312, 316, 320, and 324 and corresponding coupler elements 314, 318, 322, and 326. In one example, the apertures 312, 316, 320, and 324 can be evenly distributed on a substrate 340 of the near field coupler array 310. An advantage of evenly distributing the apertures 312, 316, 320, and 324 can be to increase a uniformity or evenness of the electric field of the antenna. In another example, the shape and size of the near field coupler array 310 may vary. For example, the near field coupler array 310 may be a square shape, a rectangular shape, a circular shape, and so forth.

The near field coupler array 310 can include power dividers 328, 330, and 332. The power dividers 328, 330, and 332 can be passive devices that can receive and split an input signal. For example, the power dividers 328, 330, and 332 can couple a defined amount of the electromagnetic power in a transmission line 342 to a port, where the port can be another power divider 328, 330, and 332 or a coupler elements 314, 318, 322, or 326. In one example, the power dividers 328, 330, and 332 can transmit power or signal equally between the antennas coupler elements 314, 318, 322, or 326. The power dividers 328, 330, and 332 can be used to combine coupler elements 314, 318, 322, or 326 on the substrate 340. The power dividers 328, 330, and 332 can be connected by a transmission line 342. The transmission line 342 can include multiple transmission line segments 344, 346, 348, 350, 352, 354, and 356. The transmission line segment 344 can couple the feed point 334 to the power divider 328. The transmission line segment 346 can couple the power divider 328 to the power divider 330. The transmission line segment 350 can couple the power divider 330 to the coupler element 314. The transmission line segment 352 can couple the power divider 330 to the coupler element 322. The transmission line segment 348 can couple the power divider 328 to the power divider 332. The transmission line segment 354 can couple the power divider 332 to the coupler element 318. The transmission line segment 356 can couple the power divider 332 to the coupler element 324.

In one example, the power divider 328 can receive an input signal from a content feed 334 and can split the input signal into first output signals. In one example, the power divider 328 can send the first output signals directly to the coupler elements 314, 318, 322, and 326. In another example, the power divider 328 can send the first output signals to other power dividers 330 and 332. The other power divider 330 can split the first output signal into second output signals and send the second output signals to the coupler elements 314 and 322. The other power divider 332 can split the first output signal into second output signals and send the second output signals to the coupler elements 314 and 322. In one example, the coupler elements 312 and 320 and the coupler elements 318 and 324 can be located along the first axis 336. In another example, the coupler elements 312 and 316 and the coupler elements 320 and 324 can be located along the second axis 338.

In one example, the apertures 312, 316, 320, and 324 can be disposed on a ground plane 360 located on a first side of the substrate 340 and the coupler elements 314, 318, 322, and 326 can be disposed on a second or opposite side of the substrate 340. In this example, the coupler element 314 can be aligned with the aperture 312, the coupler element 318 can be aligned with the aperture 316, the coupler element 322 can be aligned with the aperture 320, and the coupler element 326 can be aligned with the aperture 324. For example, the coupler elements 314, 318, and 320 can be aligned with a center axis of the apertures 312, 316, 320, and 324, respectively. In another example, a diameter or width of the coupler elements 314, 318, 322, and 326 can be larger than a diameter or width of the apertures 312, 316, 320, and 324.

Figure 4:
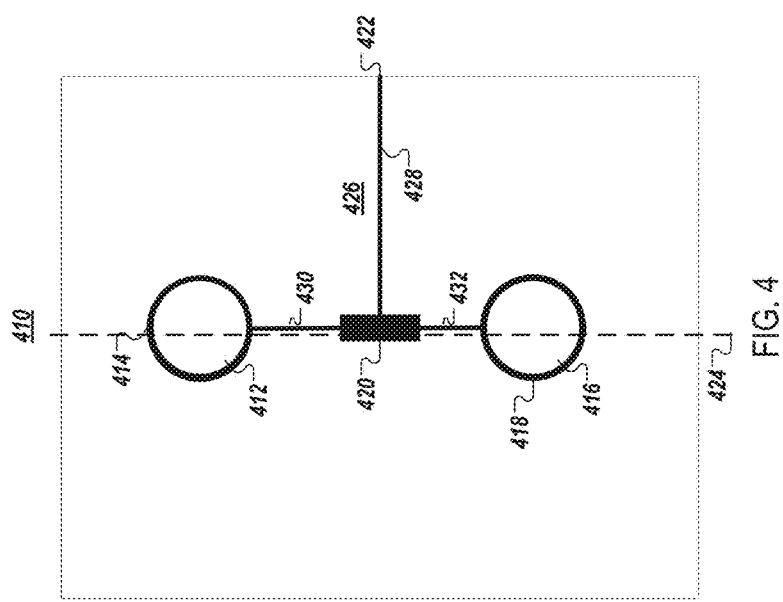
FIG. 4 illustrates a near field coupler array with multiple coupler elements according to one embodiment.

FIG. 4 illustrates a near field coupler array 410 with multiple coupler elements 414 and 418 according to one embodiment. FIG. 4 provides an exemplary embodiment of the near field coupler array 410 with 2 the apertures 412 and 416 with corresponding coupler elements 414 and 418. The transmission line 426 can include multiple transmission line segments 428, 430, and 432. The transmission line segment 428 can couple the feed point 422 to the power divider 420. The transmission line segment 430 can couple the power divider 420 to the coupler element 414. The transmission line segment 432 can couple the power divider 420 to the coupler element 418. In one example, the coupler elements 414 and 418 can be located along an axis 424 (e.g., a same axis). In another example, the coupler element 414 can be aligned with the aperture 412 and the coupler element 418 can be aligned with the aperture 416. In another example, a diameter or width of the coupler elements 414 and 418 can be larger than a diameter or width of the apertures 412 and 416.

Figure 5:
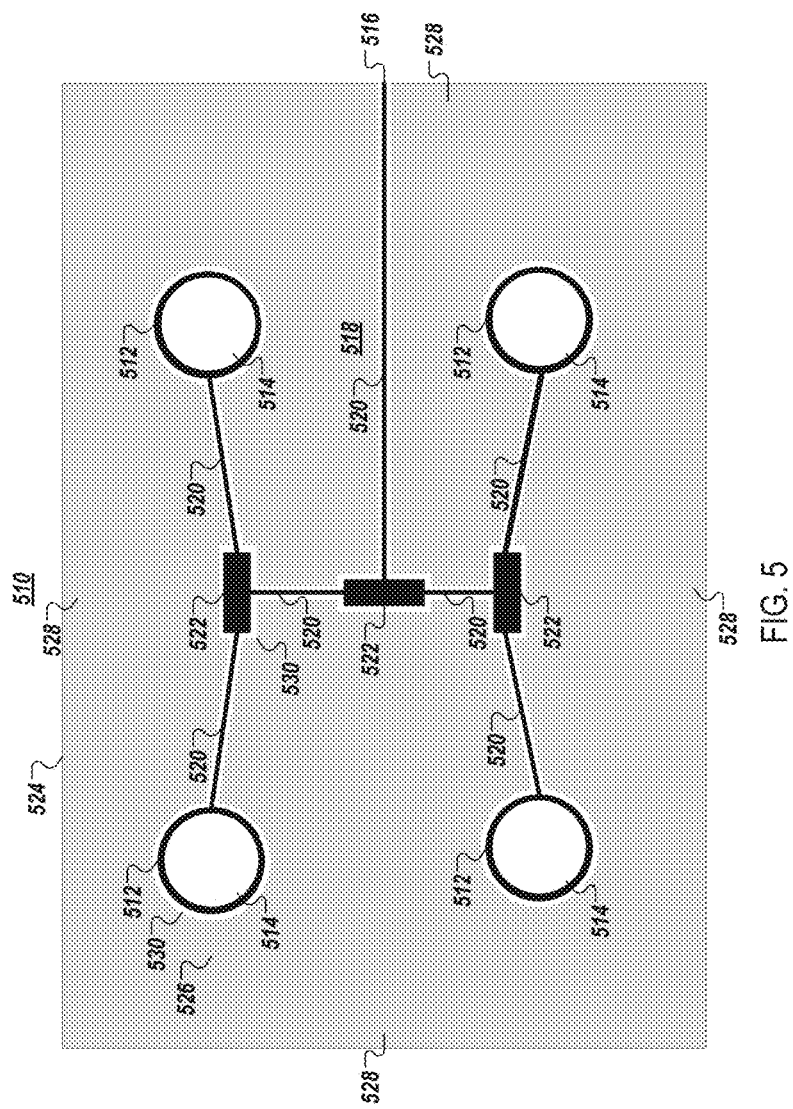
FIG. 5 illustrates a near field coupler array with a coupler substrate that may be filled in with a material according to one embodiment.

FIG. 5 illustrates a near field coupler array 510 with a coupler substrate 524 that may be filled in with a material according to one embodiment. The near field coupler array 510 can include a ground plane (not shown), a coupler substrate 524, multiple coupler elements 512, multiple apertures 514, a feed point 516, and a transmission line 518 with transmission line segments 520. As a distance between the coupler elements 512 and the sides 528 of the coupler substrate 524 may decrease, an electromagnetic leakage of the coupler elements 512 may increase. To reduce leakage from the coupler elements 512, the coupler substrate 524 of the coupler array 510 may be covered with a metallic material 526, such as copper, nickel, silver, or gold. For example, open areas of the coupler substrate 524 (e.g., areas not including the coupler elements 512, the feed point 516, the transmission lines 518, the power dividers 522) may be covered with copper to reduce leakage of the coupler elements 512. In this example, the copper filling can provide a ground for the coupler elements 512 of the coupler array 510. In another example, the transmission lines 518, power dividers 522, coupler elements 512, and/or other components of the near field coupler array 510 may have shielding 530 to reduce leakage. In another example, a surface of a first side of the coupler substrate 524 can be the ground plane and a surface of a second side of the coupler substrate 524 can be a copper layer to shield the coupler elements 512.

Figure 6:
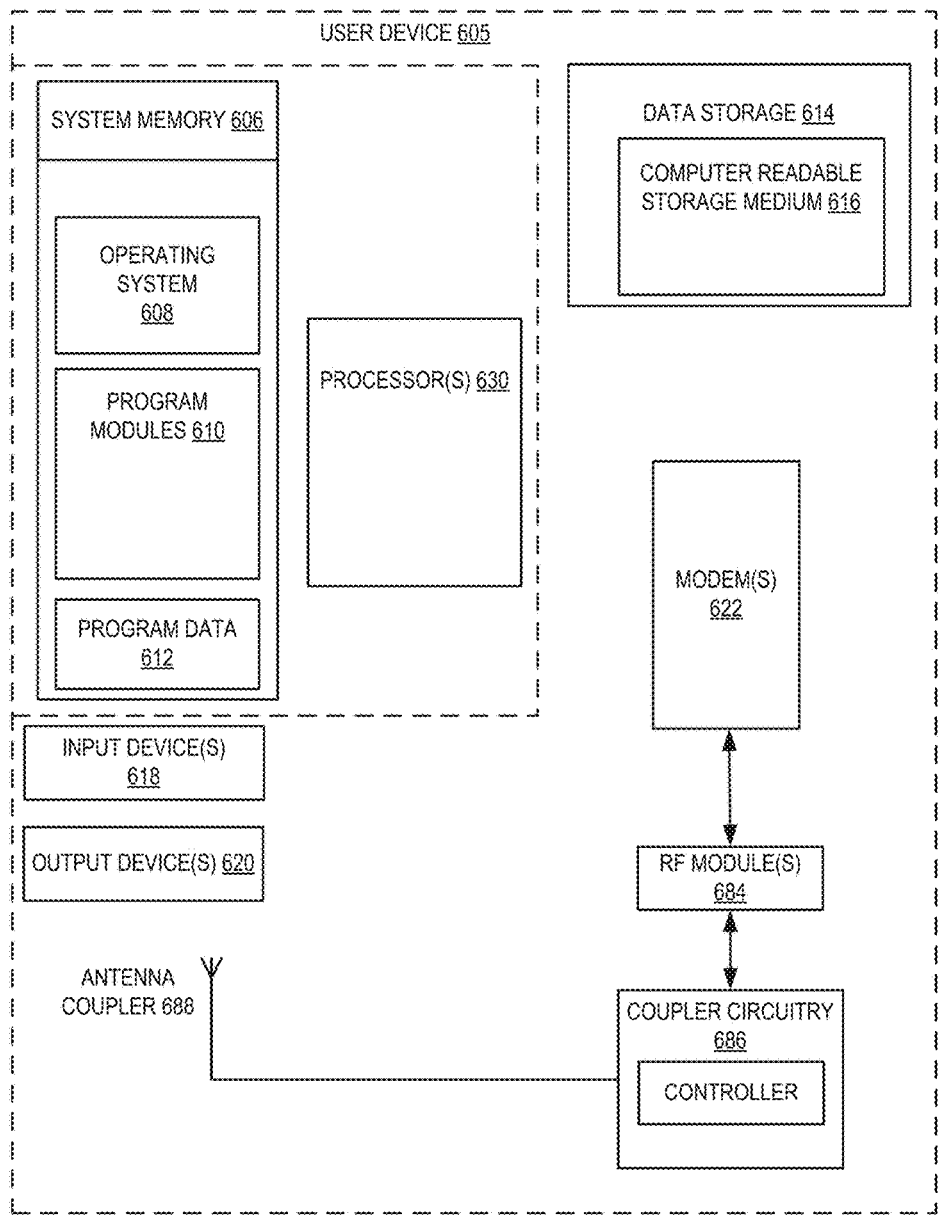
FIG. 6 is a block diagram of a user device in which embodiments of a radio device with an adaptive neutralization line may be implemented.

FIG. 6 is a block diagram of a user device 605 in which embodiments of a radio device with an adaptive neutralization line may be implemented. The user device 605 may correspond to the user device of FIGS. 1, 3, 4, and 5. The user device 605 may be any type of computing device such as an electronic book reader, a PDA, a mobile phone, a laptop computer, a portable media player, a tablet computer, a camera, a video camera, a netbook, a desktop computer, a gaming console, a DVD player, a computing pad, a media center, and the like. The user device 605 may be any portable or stationary user device. For example, the user device 605 may be an intelligent voice control and speaker system. Alternatively, the user device 605 can be any other device used in a WLAN network (e.g., Wi-Fi® network), a WAN network, or the like.

The user device 605 includes one or more processor(s) 630, such as one or more CPUs, microcontrollers, field programmable gate arrays, or other types of processors. The user device 605 also includes system memory 606, which may correspond to any combination of volatile and/or non-volatile storage mechanisms. The system memory 606 stores information that provides operating system component 608, various program modules 610, program data 612, and/or other components. In one embodiment, the system memory 606 stores instructions of the method 300, 600, 1400, 1500, and 1600 as described herein. The user device 605 performs functions by using the processor(s) 630 to execute instructions provided by the system memory 606.

The user device 605 also includes a data storage device 614 that may be composed of one or more types of removable storage and/or one or more types of non-removable storage. The data storage device 614 includes a computer-readable storage medium 616 on which is stored one or more sets of instructions embodying any of the methodologies or functions described herein. Instructions for the program modules 610 may reside, completely or at least partially, within the computer-readable storage medium 616, system memory 606 and/or within the processor(s) 630 during execution thereof by the user device 605, the system memory 606 and the processor(s) 630 also constituting computer-readable media. The user device 605 may also include one or more input devices 618 (keyboard, mouse device, specialized selection keys, etc.) and one or more output devices 620 (displays, printers, audio output mechanisms, etc.).

The user device 605 further includes modem 622 to allow the user device 605 to communicate via wireless network(s) (e.g., such as provided by the wireless communication system) with other computing devices, such as remote computers, an item providing system, and so forth. The modem 622 can be connected to zero or more RF modules 684. The zero or more RF modules 684 can be connected to zero or more coupler circuitry 686. The RF modules 684 and/or the coupler circuitry 686 may be a WLAN module, a WAN module, PAN module, or the like. Antenna coupler 688 is coupled to the coupler circuitry 686, which is coupled to the modem 622 via the RF modules 684. The modem 622 allows the user device 605 to handle both voice and non-voice communications (such as communications for text messages, multimedia messages, media downloads, web browsing, etc.) with a wireless communication system. The modem 622 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi® technology, Long Term Evolution (LTE) and LTE Advanced (sometimes generally referred to as 4G), etc.

The modem 622 may generate signals and send these signals to antenna coupler 688 via coupler circuitry 686 as described herein. User device 605 may additionally include a WLAN module, a GPS receiver, a PAN transceiver and/or other RF modules. The coupler circuitry 686 may additionally or alternatively be connected to one or more coupler arrays 688. The antenna coupler 688 may be configured to transmit in different frequency bands and/or using different wireless communication protocols. The antenna coupler 688 may be directional, omnidirectional, or non-directional antennas. In addition to sending data, the antenna coupler 688 may also receive data, which is sent to appropriate RF modules 684 connected to the antenna coupler 688.

In one embodiment, the user device 605 establishes a first connection using a first wireless communication protocol, and a second connection using a different wireless communication protocol. The first wireless connection and second wireless connection may be active concurrently, for example, if a user device is downloading a media item from a server (e.g., via the first connection) and transferring a file to another user device (e.g., via the second connection) at the same time. Alternatively, the two connections may be active concurrently during a handoff between wireless connections to maintain an active session (e.g., for a telephone conversation). Such a handoff may be performed, for example, between a connection to a WLAN hotspot and a connection to a wireless carrier system. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna element and the second wireless connection is associated with a second antenna element. In other embodiments, the first wireless connection may be associated with a media purchase application (e.g., for downloading electronic books), while the second wireless connection may be associated with a wireless ad hoc network application. Other applications that may be associated with one of the wireless connections include, for example, a game, a telephony application, an Internet browsing application, a file transfer application, a global positioning system (GPS) application, and so forth.

Though modem 622 is shown to control transmission and reception via the antenna coupler 688, the user device 605 may alternatively include multiple modems, each of which is configured to transmit/receive data via a different antenna and/or wireless transmission protocol.

The user device 605 delivers and/or receives items, upgrades, and/or other information via the network. For example, the user device 605 may download or receive items from an item providing system. The item providing system receives various requests, instructions and other data from the user device 605 via the network. The item providing system may include one or more machines (e.g., one or more server computer systems, routers, gateways, etc.) that have processing and storage capabilities to provide the above functionality. Communication between the item providing system and the user device 605 may be enabled via any communication infrastructure. One example of such an infrastructure includes a combination of a wide area network (WAN) and wireless infrastructure, which allows a user to use the user device 605 to purchase items and consume items without being tethered to the item providing system via hardwired links. The wireless infrastructure may be provided by one or multiple wireless communications systems, such as one or more wireless communications systems. One of the wireless communication systems may be a wireless local area network (WLAN) hotspot connected with the network. The WLAN hotspots can be created by products based on IEEE 802.11x standards for the Wi-Fi® technology by Wi-Fi® Alliance. Another of the wireless communication systems may be a wireless carrier system that can be implemented using various data processing equipment, communication towers, etc. Alternatively, or in addition, the wireless carrier system may rely on satellite technology to exchange information with the user device 605.

The communication infrastructure may also include a communication-enabling system that serves as an intermediary in passing information between the item providing system and the wireless communication system. The communication-enabling system may communicate with the wireless communication system (e.g., a wireless carrier) via a dedicated channel, and may communicate with the item providing system via a non-dedicated communication mechanism, e.g., a public Wide Area Network (WAN) such as the Internet.

The user devices 605 are variously configured with different functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The user devices 605 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. An electronic device comprising:
    an antenna structure selectively coupled to a feed point, the antenna structure comprising:
        a substrate;
        a ground plane disposed on a first side of the substrate, the ground plane comprising a first circular aperture, a second circular aperture, a third circular aperture and a fourth circular aperture;
        a near-field coupler array disposed on a second side of the substrate, the near-field coupler array comprising a first coupler element with its center aligned with a center axis of the first circular aperture, a second coupler element with its center aligned with a center axis of the second circular aperture, a third coupler element with its center aligned with a center axis of the third circular aperture and a fourth coupler element with its center aligned with a center axis of the fourth circular aperture, wherein a first diameter of the first coupler element is larger than a second diameter of the first circular aperture, wherein the near-field coupler array is to radiate electromagnetic energy when a second current is applied at the feed point; and
        a first power divider coupled between the first circular aperture and the second circular aperture, the power divider coupled to the feed point.

2. The electronic device of claim 1, wherein the antenna structure further comprises:

a second power divider coupled between the third coupler element and the fourth coupler element, wherein the first coupler element and the second coupler element are located along a first axis and the third coupler element and the fourth coupler element are located along a second axis that is parallel to the first axis; and a third power divider coupled between the first power divider and the second divider, the third power divider coupled to the feed point.

3. The electronic device of claim 2, wherein the antenna structure further comprises a transmission line, the transmission line comprising:

a first transmission line segment coupled between the feed point and the third power divider;

a second transmission line segment coupled between the third power divider and the first power divider;

a third transmission line segment coupled between the first power divider and the first coupler element;

a fourth transmission line segment coupled between the first power divider and the second coupler element;

a fifth transmission line segment coupled between the third power divider and the second power divider;

a sixth transmission line segment coupled between the second power divider and the third coupler element; and a seventh transmission line segment coupled between the second power divider and the fourth coupler element.

4. An antenna comprising:

a feed point; and a near-field coupler array, coupled to the feed point, to communicate at a defined frequency, the near-field coupler array comprising:

a substrate;

a ground plane disposed on a first side of the substrate, the ground plane comprising a first aperture and a second aperture;

a near-field coupler disposed on a second side of the substrate, the near-field coupler comprising a first coupler element aligned with the first aperture and a second coupler element aligned with the second aperture, wherein:

a first width of the first coupler element is larger than a second width of the first aperture;

a third width of the second coupler element is larger than a fourth width of the second aperture; and the first width and the third width have a correlation to the defined frequency; and a power divider coupled between the first aperture and the second aperture, the power divider coupled to the feed point.

5. The antenna of claim 4, the second side of the substrate comprises a copper layer configured to shield the first coupler element and the second coupler element.

6. The antenna of claim 4, wherein the first coupler element and the second coupler element are located along a same axis.

7. The antenna of claim 4, wherein the defined frequency is at least one a frequency between 400 megahertz (MHz) to 1 gigahertz (GHz), 1.7 GHz to 2.4 GHz, or 5 GHz to 6 GHz.

8. The antenna of claim 4, wherein the first width is about 5 millimeters (mm) and the second width is about 4 mm.

9. The antenna of claim 4, wherein the near-field coupler array is to communicate data to a conventional antenna of a device at a 2.4 gigahertz (GHz) frequency.

10. An electronic device comprising:

an antenna structure, coupled to a feed point, to communicate at a defined frequency, the antenna structure comprising:

a substrate;

a ground plane disposed on a first side of the substrate, the ground plane comprising a first circular aperture a second circular aperture;

a near-field coupler disposed on a second side of the substrate, the near-field coupler comprising a first coupler element aligned with the first circular aperture and a second coupler element aligned with the second circular aperture, wherein:

a first diameter of the first coupler element is larger than a second diameter of the first aperture, a third diameter of the second coupler element is larger than a fourth diameter of the second aperture;

the first diameter and the third diameter has a correlation to the defined frequency; and the first coupler element and the second coupler element are coupled to the feed point; and a power divider coupled between the first circular aperture and the second circular aperture, the power divider coupled to the feed point.

11. The electronic device of claim 10, wherein:

the near-field coupler is to radiate electromagnetic energy at a signal strength based on a current received at the feed point.

12. The electronic device of claim 11, wherein the first aperture and second aperture attenuates the electromagnetic energy faster over distance than the antenna structure.

13. The electronic device of claim 10, further comprising a transmission line comprising:

a first transmission line segment coupled between the feed point and the power divider;

a second transmission line segment coupled between the power divider and the first coupler element; and a third transmission line segment coupled between the power divider and the second coupler element.

14. The electronic device of claim 10, wherein the first coupler element is a first distance from the first side of the substrate and a second distance from the second side of the substrate, the distance defined by a quarter wavelength of the defined frequency.

15. The electronic device of claim 10, wherein the antenna structure is to communicate data to a conventional antenna of another device at a 2.4 gigahertz (GHz) frequency.

16. The electronic device of claim 10, wherein the first coupler element and the second coupler element are located along a same axis.

17. The electronic device of claim 10, wherein:

the substrate is a square shape; and the first coupler element is spaced by a first distance from a center of the substrate and the second coupler element is space by a second distance from the center of the substrate, wherein the first distance is equal to the second distance.

18. The electronic device of claim 10, wherein the first diameter is about 5 millimeters (mm) and the second diameter is about 4 mm.

19. The electronic device of claim 10, wherein the defined frequency is between 400 megahertz (MHz) to 1 gigahertz (GHz), 1.7 GHz to 2.4 GHz, or 5 GHz to 6 GHz.

* * * * *